United States Patent
Perick

(10) Patent No.: US 9,944,045 B2
(45) Date of Patent: Apr. 17, 2018

(54) COEXTRUDED POLYETHYLENE FILM

(71) Applicant: MONDI Consumer Packaging Technologies GmbH, Gronau (DE)

(72) Inventor: Matthias Perick, Ahaus-Altstaette (DE)

(73) Assignee: MONDI CONSUMER PACKAGING TECHNOLOGIES GMBH, Gronau (DE)

( * ) Notice: Subject to any disclaimer, the term of this patent is extended or adjusted under 35 U.S.C. 154(b) by 101 days.

(21) Appl. No.: 14/832,601

(22) Filed: Aug. 21, 2015

(65) Prior Publication Data
US 2016/0059515 A1 Mar. 3, 2016

(30) Foreign Application Priority Data

Sep. 2, 2014 (EP) .................................... 14183262

(51) Int. Cl.
| B32B 27/32 | (2006.01) |
| B32B 5/18 | (2006.01) |
| B29C 44/20 | (2006.01) |
| B32B 27/08 | (2006.01) |
| B29K 105/04 | (2006.01) |
| B29L 7/00 | (2006.01) |
| B29L 9/00 | (2006.01) |

(52) U.S. Cl.
CPC ................ B32B 5/18 (2013.01); B29C 44/20 (2013.01); B32B 27/08 (2013.01); B32B 27/32 (2013.01); B32B 27/327 (2013.01); *B29K 2023/06* (2013.01); *B29K 2105/046* (2013.01); *B29K 2995/0024* (2013.01); *B29L 2007/008* (2013.01); *B29L 2009/00* (2013.01); *B32B 2250/03* (2013.01); *B32B 2250/242* (2013.01); *B32B 2250/40* (2013.01); *B32B 2439/00* (2013.01)

(58) Field of Classification Search
CPC ................ B29C 44/20; B29K 2023/06; B29K 2105/046; B29K 2995/0024; B29L 2007/008; B29L 2009/00; B32B 2250/03; B32B 2250/242; B32B 2250/40; B32B 2439/00; B32B 27/08; B32B 27/32; B32B 27/327
See application file for complete search history.

(56) References Cited

U.S. PATENT DOCUMENTS

| 4,473,665 | A | 9/1984 | Martini-Vvedensky et al. |
| 4,522,675 | A | 6/1985 | Sharps, Jr. |
| 4,533,578 | A | 8/1985 | Boyd et al. |
| 4,657,811 | A | 4/1987 | Boyd et al. |
| 4,762,230 | A | 8/1988 | Croce |
| 4,781,294 | A | 11/1988 | Croce |
| 4,856,656 | A | 8/1989 | Sugimoto et al. |
| 5,000,992 | A | * 3/1991 | Kelch ................. B29C 47/0026 215/224 |
| 5,158,986 | A | 10/1992 | Cha et al. |
| 5,160,674 | A | 11/1992 | Colton et al. |
| 5,215,691 | A | 6/1993 | Bland et al. |
| 5,654,082 | A | 8/1997 | Kagawa |
| 5,866,053 | A | 2/1999 | Park et al. |
| 6,051,174 | A | 4/2000 | Park et al. |
| 6,096,793 | A | 8/2000 | Lee et al. |
| 6,114,025 | A | 9/2000 | DeVaudreuil et al. |
| 6,228,446 | B1 | 5/2001 | Moffitt |
| 6,231,942 | B1 | 5/2001 | Blizard et al. |
| 6,270,429 | B1 | * 8/2001 | Sullivan ................. A63B 37/00 473/370 |
| 6,403,663 | B1 | 6/2002 | DeSimone et al. |
| 6,613,811 | B1 | 9/2003 | Pallaver et al. |
| 6,616,434 | B1 | 9/2003 | Burnham et al. |
| 6,913,389 | B2 | 7/2005 | Kannankeril et al. |
| 6,939,919 | B2 | 9/2005 | Tau et al. |
| 6,946,203 | B1 | * 9/2005 | Lockhart ................. B29C 55/12 428/515 |
| 7,341,683 | B2 | 3/2008 | Marrelli |
| 2001/0000930 | A1 | 5/2001 | Kim |
| 2001/0003466 | A1 | 6/2001 | Kubo |
| 2001/0020513 | A1 | 9/2001 | Tupil et al. |
| 2001/0047042 | A1 | 11/2001 | Anderson et al. |
| 2004/0080065 | A1 | 4/2004 | Kim |
| 2004/0115418 | A1 | 6/2004 | Anderson et al. |
| 2004/0185241 | A1 | 9/2004 | Anderson et al. |
| 2004/0213983 | A1 | 10/2004 | Nodono et al. |
| 2005/0256215 | A1 | 11/2005 | Burnham et al. |
| 2006/0003121 | A1 | 1/2006 | Scheller |
| 2008/0044701 | A1 | * 2/2008 | Tezuka ...................... B32B 1/08 429/412 |
| 2008/0138593 | A1 | 6/2008 | Martinez |
| 2009/0011219 | A1 | 1/2009 | Della Torre et al. |
| 2009/0029143 | A1 | 1/2009 | Kanae et al. |
| 2009/0263645 | A1 | 10/2009 | Barger et al. |
| 2009/0317578 | A1 | 12/2009 | Rogers et al. |
| 2012/0228793 | A1 | 9/2012 | Lindenfelzer et al. |
| 2012/0328746 | A1 | 12/2012 | Perick |
| 2013/0280517 | A1 | 10/2013 | Buehring et al. |
| 2013/0303645 | A1 | 11/2013 | Dix et al. |

FOREIGN PATENT DOCUMENTS

| CA | 1145724 A1 | 5/1983 |
| DE | 2038557 A | 2/1972 |
| DE | 3722139 C2 | 2/1989 |
| DE | 202005002615 U1 | 6/2005 |
| DE | 19653608 B4 | 3/2006 |

(Continued)

*Primary Examiner* — Lawrence Ferguson
(74) *Attorney, Agent, or Firm* — Andrew Wilford

(57) ABSTRACT

A coextruded polyethylene blown film, particularly for packaging, has a thickness between 20 µm and 250 µm and is formed by a foamed, particle-containing core layer between a first unfoamed weldable outer layer and a second unfoamed outer layer. The core layer has a polyethylene or a polyethylene-based mixture as a polymer component having a melt mass-flow rate (MFR) per DIN ISO EN 1133 of greater than 5 g/10 min at 190° C. and 2.16 kg.

13 Claims, 1 Drawing Sheet

(56) References Cited

FOREIGN PATENT DOCUMENTS

| | | | |
|---|---|---|---|
| EP | 0843246 | A2 | 11/1987 |
| EP | 83167 | A1 | 7/1989 |
| EP | 1237751 | A1 | 12/2000 |
| EP | 1189978 | A1 | 3/2002 |
| EP | 1719600 | A2 | 11/2006 |
| EP | 1888676 | A2 | 2/2008 |
| EP | 2258545 | A1 | 12/2010 |
| GB | 2110215 | A | 6/1983 |
| JP | 2001055242 | A | 2/2001 |
| JP | 2001130586 | A | 5/2001 |
| JP | 2002154555 | A | 5/2002 |
| JP | 3823967 | B2 | 11/2003 |
| JP | 2004091024 | A | 3/2004 |
| JP | 2006027185 | A | 2/2006 |
| JP | 3823967 | B2 | 7/2006 |
| JP | 2007045046 | A | 2/2007 |
| JP | 2007045047 | A | 2/2007 |
| JP | 2007230637 | A | 9/2007 |
| JP | 2013-111811 | A | 6/2013 |
| KR | 2004-0005806 | A | 1/2004 |
| KR | 2004-0007381 | A | 1/2004 |
| KR | 2013-0100597 | A | 3/2012 |
| TW | 384271 | B | 3/2000 |
| WO | 2008/100501 | A2 | 8/2008 |
| WO | 2013/179947 | A1 | 12/2013 |

\* cited by examiner

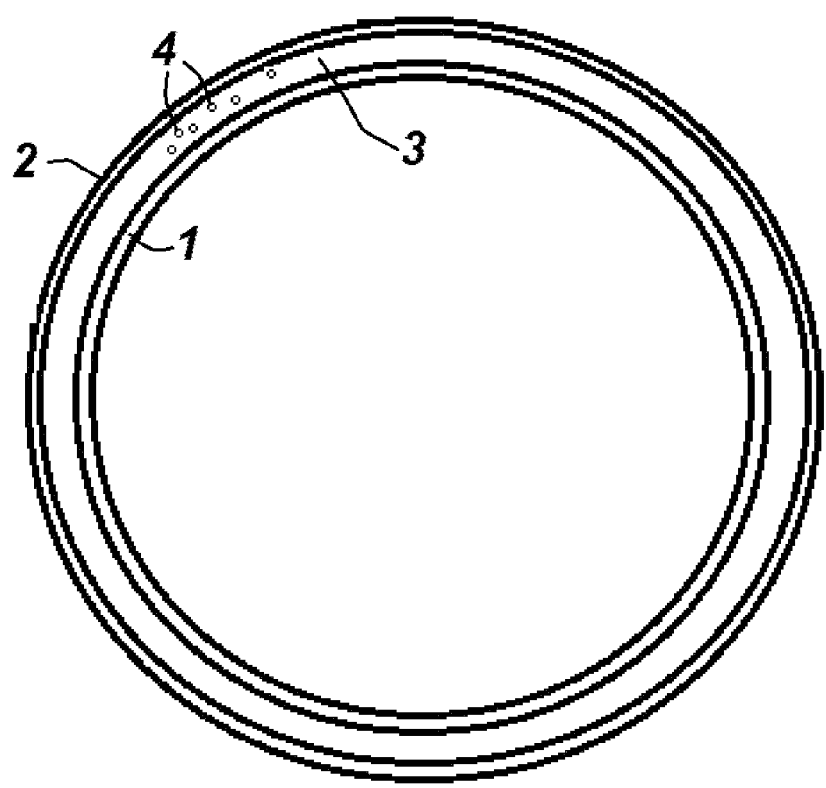

COEXTRUDED POLYETHYLENE FILM

FIELD OF THE INVENTION

The invention relates to a multilayered plastic film with at least one foamed film layer. In particular, the invention involves a coextruded polyethylene blown film with a thickness between 20 μm and 250 μm and formed by a foamed, particle-containing core layer sandwiched between a first unfoamed weldable outer layer and a second unfoamed outer layer.

BACKGROUND OF THE INVENTION

A coextruded polyethylene blown film is particularly suited to the manufacture of packaging, it being possible to form such packaging by thermal welding due to the first weldable outer layer of the polyethylene coextruded film, in which case either a film blank or a continuous web is formed into packaging by folding or at least two film blanks or two film webs are connected by hot-seal welds.

The coextruded polyethylene blown film can be used both in a so-called FFS method (Form Fill and Seal) where bag-like packaging is formed immediately during packing of the product, and in the manufacture of prefabricated packaging that is subsequently filled.

Moreover, the coextruded polyethylene blown film can also be used as a cover film in a tray pack, or as a label or the like.

The foaming of a film layer can be done for various reasons. First, foaming results in a lower mass per unit area relative to the resulting thickness of the film and thus saves material. Particularly in combination with other unfoamed film layers, it usually also results in an improvement of the mechanical characteristics relative to the quantity of plastic used as a result of the greater thickness. For example, if a foamed core layer is combined with unfoamed covering layers according to the preamble of claim 1, it results in a kind of plywood effect in which the further separated outer layers can be deformed less readily relative to each other as a result in the increase in volume of the core layer compared to an unfoamed design. What is more, the other physical characteristics of the resulting coextruded film are also influenced by the foaming of at least one film layer.

According to CA 1,145,724, EP 0 512,740, JP 2004-91024, EP 1,761,437, JP 2007-230637, DE 10 2011 051 193, a foamed film layer is used as a mechanical buffer in order to increase the puncture resistance or compensate for mechanical deformations from the filled product to a certain extent.

At least one foamed film layer can also be used for thermal insulation. Such approaches are known from JP 2001-130586, U.S. Pat. No. 6,913,389, KR 2004-0005806, and KR 2004-0007381.

Moreover, a foamed film layer can also result in weakening in a film that promotes tearing in a desired manner. As a result of the lower density and the free spaces within the at least one foamed film layer, it can be torn relatively easily in its direction of thickness. Depending on the specific design, foaming can also facilitate the separation of layers relative to an adjacent film layer, it being possible to exploit these characteristics for the manufacture of tear-open packages. Furthermore, if the film is torn perpendicular to its thickness, particularly in the event of a tear propagation along the manufacturing direction, weakening occurs as a result of the foaming. Depending on the manufacturing process, pronounced anisotropy can also be attributed to the fact that the pores or cells formed during foaming are aligned in a manufacturing direction, making tearing particularly easy along the longitudinal direction of these cells or pores (i.e. along the manufacturing direction). The use of foamed film layers to produce defined tearing characteristics is described, for example, in GB 2,110 215 B, U.S. Pat. Nos. 4,762,230, 4,781,294, EP 673,756, JP 3823967 and DE 20 2005 002 615.

The foaming of at least one film layer also leads to increased roughness or undulation of the film surface, this effect being utilized advantageously in DE 2,038,557, DE 37 22 139 C2, DE 196 53 608 B4, JP 2001-055242, EP 1,237,751. However, undulation or roughness resulting from foaming is also undesirable in many cases, for example if a surface of a package is to have an appearance that is as uniform, smooth and high quality as possible.

Another effect of a foamed film layer that is known from practice is that of the film having a higher level of cloudiness and opacity. For example, through foaming, the use of colored particles can also be reduced in order to produce opaque or merely translucent film. The increasing of the opacity and exploitation of this effect are described in EP 83,167.

Various methods are known for manufacturing films with at least one foamed film layer. The foaming can particularly be done by a chemical reaction or a physical process. For example, substances contained in the polymer melt during extrusion can vaporize or react and form a gas. In this context, it is also possible to introduce microspheres into the polymer melt having a propellant within a meltable coating.

During physical foaming, a propellant is added to the molten plastic mass in the extruder under high pressure. Examples of suitable propellants are water, nitrogen or carbon dioxide.

Especially uniform, good mechanical characteristics are achieved if the foamed layer has an especially fine-celled foam structure that can be formed using the so-called MuCell method, for example. Apparatuses for executing the method or for retrofitting standard extruders are sold by Drexel Inc., USA. The MuCell method is described particularly in U.S. Pat. Nos. 5,866,053, 6,051,174, EP 923,443, EP 1,275,485, EP 377,650, EP 580 777, U.S. Pat. No. 6,231, 942, EP 996,536, EP 1,040 158, EP 1,131,387, EP 1,283, 767, EP 1,337,387, EP 1,539,868, EP 1,337,387, and EP 1,575,763. The present invention relates particularly to polyethylene coextruded films in which the foamed core layer is formed according to the described MuCell method.

During extrusion, a propellant is added to the melt for the core layer to be foamed that brings about foaming during extrusion or immediately after emerging from the extrusion gap. On exiting the coextrusion gap, the propellant added previously to the melt under pressure expands suddenly. The propellant is usually present within the extruder as a supercritical fluid that combines the incompressibility of a liquid and the dissolution characteristics of a gas. The propellant goes into solution in the polymer melt and forms a single-phase system distributed in the plastic melt. As a result of a quick drop in pressure upon emerging from the extrusion die, nucleating particles form in the polymer melt. The gas is released from the melt, and a very fine, uniform foam structure is formed. The particles in the core layer can promote the formation of an especially large quantity of especially small nucleating particles. The particles thus do not serve in the framework of the invention as a favorable volume material, or at least not exclusively; rather, they are used as a functional component for improving the film characteristics, namely for the formation of an especially large quantity of especially small pores or cells. However, the particles can also be referred to as nucleating agents.

To enable formation of cells or pores that are as uniform and fine as possible, it has proven advantageous to maintain the solubility pressure in the melt at a high level for as long as possible in order to then achieve a sudden drop in pressure only as the melt emerges from an extrusion die. While extrusion dies for blown film extrusion or wide-slot extrusion often expand like a cone or are straight, when foaming is performed in the framework of a MuCell method, narrowing the gap right at the end can be advantageous in order to maintain the pressure of the melt high for as long as possible, thus achieving a drop in pressure that is as steep as possible. If the gap is too narrow, however, excessive resistance occurs during extrusion, and irregularities in the structure can occur even in the case of multilayered coextrusion with a foamed core layer and unfoamed outer layers with partial breakaway of the melt flow. Such technical solutions are known from US 2012/0228793, WO 2013/148841.

Other methods for manufacturing a film or a plastic body with at least one foamed layer are also known from U.S. Pat. Nos. 4,473,665, 4,522,675, EP 580 777, EP 843,246, TW 384271, U.S. Pat. No. 6,403,663, EP 1,189,978, U.S. Pat. No. 7,341,683, EP 1,857,501, and EP 1,888,676.

Various extrusion apparatuses are the subject matter of EP 1,075,921 and EP 1,719,600.

Printed publications U.S. Pat. Nos. 4,533,578, 4,657,811, EP 237,977, U.S. Pat. No. 5,000,992, EP 5,553,522, JP 11079192, U.S. Pat. No. 6,096,793, EP 1,088,022, JP 2002-154555, EP 1,297,067, EP 1,646,677, JP 2006-027185, JP 2007-045047, JP 2007-045046, EP 1,857,501, EP 1,973,733, EP 2,043,857, WO 2008/100501, WO 2009/155326, EP 2,258,545, JP 2013-111811, EP 2,668,036, KR 2013-0100597, WO 2013/179947 relate to other films or plastic objects with a foamed layer or the manufacture thereof.

As explained above, the present invention specifically relates to a coextruded polyethylene blown film, particularly for packaging, with a thickness between 20 µm and 250 µm comprising a foamed, filler-containing core layer between a first unfoamed weldable outer layer and a second unfoamed outer layer. The coextruded polyethylene blown film can particularly be manufactured using the previously described MuCell method, with blown film coextrusion being preferred.

In known polyethylene coextruded films with the features described above, the foamed core layer results in the drawback that the outer layers are uneven due to the underlying core layer with bubble-like cells and pores, and the visual appearance is impaired.

OBJECT OF THE INVENTION

In view of this, it is the object of the present invention to provide a coextruded polyethylene blown film having less undulation and roughness on the surface.

SUMMARY OF THE INVENTION

A coextruded polyethylene blown film, particularly for packaging, has according to the invention a thickness between 20 µm and 250 µm and comprises a foamed, particle-containing core layer between a first unfoamed weldable outer layer and a second unfoamed outer layer. The core layer has a polyethylene or a polyethylene-based mixture as a polymer component having a melt mass-flow rate (MFR) per DIN ISO EN 1133 of greater than 5 g/10 min at 190° C. and 2.16 kg.

The melt mass-flow rate (MFR) is used to characterize the flow behavior of a thermoplastic material under predetermined pressure and temperature conditions. The melt mass-flow rate is often used as a comparative figure for characterizing the flow characteristics of different plastics. According to DIN ISO EN 1133, it is defined as the mass of plastic that flows through a capillary having certain dimensions in 10 min at a predetermined temperature and a predetermined pressure. The viscosity of a thermoplastic material usually increases with the chain length of the polymers and with the degree of branching, and the melt mass-flow rate decreases accordingly.

According to the present invention, the core layer is formed from particles and the polyethylene-based polymer component and, optionally, other processing additives, usually in a proportion of less than 10% by weight. According to the invention, the entire polyethylene-based polymer component has a melt mass-flow rate (MFR) of greater than 6 g/10 min at 190° C. and 2.16 kg and thus has a relatively low viscosity. Particularly in connection with the particles provided according to the invention, very uniformly distributed small cells can form during manufacture after exiting from the gap of a coextrusion die, the relatively low-viscosity core layer being between the two outer layers during the extrusion process after exiting from the extrusion die, thus resulting in the of the core layer on the outside. Due to the high melt mass-flow rate of greater than 5 g/10 min, preferably of greater than 6 g/10 min, more preferably of greater than 8 g/10 min and especially preferably greater than 10 g/10 min at 190° C. and 2.16 kg, however, there are relatively uniform conditions throughout the entire core layer immediately after extrusion that promote especially uniform foaming.

In the framework of the invention, it is particularly also achieved that the outer layers have little undulation and roughness on the surfaces of the outer layers in comparison to known coextruded polyethylene blown film with a foamed core layer.

Another essential aspect of the invention is the manufacture of the coextruded film as a blown film, which also leads to specific, reproducible and clearly distinguishable characteristics.

Particularly in order to form fine and uniform pores, it is advantageous if a sudden drop in pressure occurs during glass film coextrusion, upon which the pores are then able to form freely. During cast film extrusion, on the other hand, no film tube is formed, but rather the coextruded film is deposited or even smoothed in a roller gap. Smoothing of the surface also occurs immediately, so that the drawbacks described in connection with a coextruded blown film containing at least one foamed layer do not arise. However, less-effective foaming is observed in cast extrusion, because pressure is exerted as a result of the extruded film lying against the surface of a roller or the like, which does not enable free formation and expansion of small cells.

According to the invention, the entire polymer component of the core layer is used in the determination of the melt mass-flow rate. For instance, if the core layer has different polyethylene types, the melt mass-flow rate must be determined for the corresponding polymer mixture.

The proportion of particles in the core layer is usually between 5 and 50% by weight, preferably between 10 and 30% by weight.

As already described above, the first outer layer and the second outer layer serve to limit coextrusion and the foaming of the core layer that also build a certain counterpressure relative to the expansion of the core layer. Preferably, the first and second outer layers have a substantially higher viscosity and hence a substantially lower melt mass-flow rate per DIN ISO EN 1133 at 190° C. and 2.16 kg. If the first and the second outer layer each have a polyethylene or a polyethylene-based mixture as a polymer component, the melt mass-flow rate (MFR) of the two polymer components is each preferably below 3 g/10 min, more preferably below 2 g/10 min and especially preferably below 1 g/10 min.

In other words, the ratio of the melt mass-flow rate of the polymer component of the core layer to the melt mass-flow rate of the polymer components of the two outer layers is preferably about 2, more preferably at least 3 and especially preferably at least 6. Ratios of greater than 10 can also readily be achieved in the framework of the invention. Through the ratio formed in this way, it becomes clear that the two outer layers are substantially more viscous than the core layer. In consideration of these specifications, it was possible to form films with a relatively uniform, level surface in preliminary tests. It is assumed that this can be attributed, on the one hand, to the fact that the two outer layers with a lower melt mass-flow rate immediately during extrusion bring about increased counterpressure during the expansion of the core layer, although, on the other hand, the relatively viscous outer layers also cannot be deformed as strongly through the formation of individual cells and bubbles in the core layer. The outer layers are therefore too viscous, as it were, in order to undergo pronounced deformation when starting from a substantially level alignment.

The first weldable outer layer and the second outer layer can have polymer mixtures with an equal or substantially equal melt mass-flow rate in order to bring about an approximately corresponding counterpressure during the expansion of the core layer as described above.

According to an alternative embodiment of the invention a provision is made that the first, weldable outer layer has a higher melt mass-flow rate than the second outer layer. The first outer layer provided as a sealing layer is often arranged on the interior, so that a certain slight undulation can be accepted, whereas the second, usually exterior outer layer should be as smooth as possible. For example, the first outer layer can have a melt mass-flow rate of 2 to 3 g/10 min, while the second outer layer has a melt mass-flow rate of 1 g/10 min. When the melt mass-flow rate is set up in such an asymmetrical manner, the surface of the second outer layer can ultimately be even smoother since, during the foaming of the core layer, the individual cells can propagate more strongly in the direction of the first outer layer and tend rather to lead to unevenness there.

As described above, the MuCell method described above is preferably used for the foaming of the core layer relative to the invention, with a microcell structure being produced in the core layer. The microcell structure is characterized by a pore structure with an average pore size of less than 100 µm, it also being possible for the pore size to lie in the range between 0.1 µm and 10 µm. Since the individual pores or cells can be aligned through the coextrusion process in a certain way in the manufacturing direction, precisely the volume of the closed cells of the core layer is a suitable characteristic feature, the volume being preferably less than 50000 µm³, preferably less than 20000 µm³ and, for example, less than 5000 µm³.

According to a preferred embodiment of the invention, if nitrogen is used as a propellant for the physical foaming, the core layer has commensurately closed cells filled with nitrogen. The degree of foaming can be adjusted through the quantity of propellant added, the viscosity of the polymer components of core layer and outer layers, and the extrusion conditions. Preferably, the core layer has a density between 0.2 g/cm³ and 0.8 g/cm³. The increase in the thickness of the core layer compared to an unfoamed layer with the same polymer quantity is thus typically between about 20% and 500%, especially preferably between about 40% and 200%, especially preferably between 50% and 120%.

The coextruded polyethylene blown film according to the invention distinguishes itself from a completely unfoamed film through a low mass per unit area and thus through lower material usage, it being possible to achieve sufficient mechanical characteristics in terms of stiffness and tear resistance through appropriate coordination of the layer thicknesses of the coextruded polyethylene blown film. Preferably, the thickness of the foamed core layer is between 30% and 70% of the total thickness of the entire coextruded polyethylene blown film. Accordingly, the two outer layers each have a thickness that is between about 15% and 30% of the total thickness of the coextruded polyethylene blown film.

Initial tests have shown that the quality of the surfaces of the outer layers increases with an increasing melt mass-flow rate of the polymer component of the core layer, although this can lead to a certain extend to an impairment of the mechanical characteristics of the coextruded polyethylene blown film.

The polymer component of the core layer can contain a linear polyethylene as the main component, including those obtained using metallocene catalysts. Linear polyethylenes of high (LHDPE), medium (LMDPE) and low (LLDPE) density are worthy of consideration. In principle, all known linear types of polyethylene can be considered, i.e. polyethylene-based alpha-olefin copolymers. Copolymers with hexene (C6) and octene (C8) are preferred.

Using the various types of linear polyethylene described above, the mechanical characteristics can be adjusted over a wide range. Particularly relative to packaging, a low-density linear polyethylene is often advantageous for avoiding an excessively stiff and brittle package design.

However, a mixture which, besides the linear polyethylene, particularly contains a linear low-density polyethylene (LLDPE), at least one other low-density polyethylene, is preferred for the polymer component of the core layer. Without restriction, it can be a nonlinear low-density polyethylene (LDPE) or linear low-density polyethylene (mLLDPE) obtained using metallocene catalysts. Relative to these embodiments as well, linear polyethylene is provided as the main component of the polymer component of the core layer. For example, the core layer can comprise 10 to 30% by weight of particles including processing additives, 10 to 30% by weight LDPE or mLLDPE and the rest LLDPE.

The present invention relates to a coextruded polyethylene blown film that made with at least three layers, i.e. the two outer layers and the core layer. Even though additional layers can be present in principle, a three-layer embodiment is preferred where the outer layers immediately adjoin the core layer on opposite sides.

The first unfoamed, weldable outer layer enables the formation of packaging through welding. The first outer layer is thus usually arranged on the inside in packaging.

In contrast, the second outer layer is on an outer side of the packaging, it being possible for the second outer layer to either form an exposed surface or be laminated with another cover film. For example, the second outer layer can be laminated using an adhesive with a cover film that, without constituting a restriction, can contain polyethylene terephthalate (PET), biaxially oriented polypropylene (BOPP) or even polyethylene, it being possible in the last-mentioned variant to also provide an overall substantially homogeneous packaging film.

According to the invention, at least one of the two outer layers contains colored particles in order to obtain a generally opaque film. The fact that the core layer is clouded by the foaming at least to a certain extent can also be exploited here, so that the proportion of colored particles can optionally be reduced compared to an unfoamed coextruded film.

Even though a lower level of undulation and surface roughness can be achieved in the framework of the invention particularly on the surface of the second outer layer, unavoidable residual undulation due to the foamed core layer can lead to problems in a shiny surface even with the invention. In particular, surface roughness in a shiny surface that is visible as a result of light refraction that is somewhat reminiscent of the structure of an orange peel cannot be avoided in all cases.

Surprisingly, this impression can be completely avoided if the second outer layer is matte, laminated with a matte film or provided with a matte coating. Even if these measures do not reduce the actual unevenness at all or at least not substantially, the undulation is no longer visible due to the diffuse light refraction. Surprisingly, this applies particularly to the structure that results from foaming, which gives the user the impression of irregularities or divots in a shiny surface.

Preferably, when matte raw materials are used for the second unfoamed outer layer or when the second unfoamed outer layer is coated with a matte paint, the coextruded polyethylene blown film has a matte surface with a reflectometer value according to DIN 67530 at an angle of measurement of 85° of less than 40, preferably less than 30, particularly between 10 and 25. Accordingly, the reflectometer value according to DIN 67530 at an angle of measurement of 60° is usually less than 30, preferably less than 20 and particularly between 5 and 15. At an angle of measurement of 20°, the reflectometer value is usually less than 10, preferably less than 5 and particularly between 1 and 3.

According to an alternative embodiment of the invention, if the coextruded polyethylene blown film on the second outer layer is connected as a lamination layer to a matte film, this results in the indicated reflectometer values, particularly on the surface of the additional cover film.

BRIEF DESCRIPTION OF THE DRAWING

The above and other objects, features, and advantages will become more readily apparent from the following description, reference being made to the sole FIGURE of accompanying drawing that is an end view of a three-layer tube according to the invention.

SPECIFIC DESCRIPTION OF THE INVENTION

As seen in the drawing a coextruded tube comprises thin unfoamed outer and inner layers 1 and 2 that sandwich a foamed core layer 3 having cells as shown partially at 4.

The invention is explained below in more detail with reference to several embodiments.

In preliminary tests, three respective formulations were considered for the first unfoamed, weldable outer layer 1 as the sealing layer, the core layer 3 and the second unfoamed outer layer 2.

In order to provide a sealing layer with the usual sealing characteristics, the first outer layer 1 can be made of a material composition A1 having polyethylene with a density between 0.92 to 0.94 g/cm$^3$, with mixtures of linear and nonlinear polyethylenes being particularly worthy of consideration. In order to provide a low-melting first outer layer 1 as the sealing layer, a polyethylene with a density of 0.905 to 0.917 g/cm$^3$ (ULDPE) can be used as material A2. For a sealing layer with a very low melting temperature, on the other hand, a polyethylene-based polymer material A3 with a density of less than 0.905 g/cm$^3$ can be used.

The composition of the core layer 3 can be based on the desired characteristics of the coextruded polyethylene blown film.

Particularly in order to form relatively thick films, where a slightly higher level of surface roughness can be accepted and where a high level of weld strength is desired, a material B1 can be used for the core layer 3 with 20% by weight talc as a filler and the rest LLDPE C8 with a melt mass-flow rate of 6 to 8.

On the other hand, for thinner films with an improved, lesser surface roughness and a low weld strength, a material B2 with 20% by weight talc, 20% LDPE and the rest LLDPE is preferably used, the two cited polyethylene types having a melt mass-flow rate between 6 and 8, so that, as expected, the melt mass-flow rate of the polymer component made of LLDPE and LDPE also has commensurate values.

As the third material B3, a composition of 20% talc, 20% mLLDPE with an MFI of 15 to 20 and the rest LLDPE with an MFI of 6 to 8 is provided. The formulation B3 is suited both to thin and thick films and leads to a good weld strength and good surface characteristics with little surface roughness. Compared to materials B1 and B2, however, process management during coextrusion is somewhat difficult, and higher material costs are involved.

Together with the first unfoamed outer layer 1, the first unfoamed outer layer 2 contributes to the stiffness and strength of the coextruded polyethylene blown film. Consequently, the mechanical characteristics of the entire coextruded polyethylene blown film can be substantially influenced by the material of the second outer layer 2. A polyethylene mixture of LDPE and LLDPE with a density of about 0.92 g/cm$^3$ is provided as the first material C1 for the second outer layer 2.

For increased stiffness, a mixture of LDPE and LHDPE with a density between 0.925 and 0.935 g/cm$^3$ can be used as material C2. Finally, a relatively high level of stiffness can be achieved if LDPE is mixed down with linear high-density polyethylene (LHDPE) in a third material C3 for the first unfoamed outer layer 2, in which case the total density of the mixture C3 lies between 0.935 and 0.95 g/cm$^3$.

Independently of the requirement profiles, the different formulations for the individual layers can be freely combined with one another. For example, if a relatively thin film with little surface roughness is desired that has a low melting point with a low weld strength and a high level of stiffness, a layer construction A2/B2/C3 is preferably used. As will readily be understood, all other compositions are also possible depending on requirements.

Another example of layer construction is described in Table 1. The thickness ratios are shown with reference to an unfoamed core layer 3. On foaming of the core layer 3, the thickness ratio thus changes accordingly.

TABLE 1

| Layer: | First outer layer 1 | Core layer 3 | |
|---|---|---|---|
| Layer thickness, unfoamed: | 29% | 42% | 29% |
| Components: | 57% mLLDPE-C8 Density: 0.925 g/cm³/ MFI 0.85 | 77% LLDPE-C8 Density: 0.919 g/cm³/ MFI 6 | Second outer layer 2 |
| | 28% LDPE Density: 0.929 g/cm³/ MFI 0.55 | 20% talc batch (with 60% talc) | 26% LDPE Density: 0.923 g/cm³/ MFI 2 |
| | 14% white batch (with 60% TiO2) | 2% lubricant anti-block batch | 2% lubricant anti-block batch |
| | 1% fluoropolymer batch (processing additive) | 1% thermostabilizer batch | 1% fluoropolymer batch (processing additive) |

TABLE 2

| | Prescribed thickness unfoamed/ foamed μm/μm | Measured thickness (DIN 53370) μm | Mass per unit area g/m² | Force at breaking (DIN EN ISO 527-1) Manufacturing direction MD N/Inch | Force at breaking (DIN EN ISO 527-1) Transverse direction CD N/Inch | Elongation at breaking (DIN EN ISO 527-1) MD % | Elongation at breaking (DIN EN ISO 527-1) CD % | Flexural rigidity 30°/10 nm (DIN 53121) MD mN | Flexural rigidity 30°/10 nm (DIN 53121) CD mN | Tear resistance per Elemdorf (ISO) MD mN | Tear resistance per Elemdorf (ISO) CD mN | Opacity (DIN 53146) % | COF (DIN EN ISO 8295) First outer layer 1 against 1 | COF (DIN EN ISO 8295) First outer layer 1 against metal 1 | Weld strength 150° C./ 1.5 s N/Inch | WVTR (DIN 53122-1) x° C./ x% RH g/(m²*day) |
|---|---|---|---|---|---|---|---|---|---|---|---|---|---|---|---|---|
| Comparative | 100/100 | 98.9 | 94.7 | 73.9 | 69.1 | 692 | 919 | 25.4 | 36.6 | 6954 | 34519 | 78 | 0.15 | 0.20 | 44.5 | 2.8 |
| Film 1 | 90/100 | 98. | 86.3 | 59.5 | 38. | 639 | 607 | 26.4 | 34.4 | 7168 | 28352 | 80 | 0.1 | 0.1 | 40.3 | 3.2 |
| Film 2 | 80/100 | 103.3 | 75.5 | 41.4 | 27. | 451 | 500 | 25.6 | 35.5 | 1961 | 22267 | 77 | 0.1 | 0.2 | 35.2 | 4.9 |
| Film 3 | 70/100 | 104.6 | 65.6 | 36.7 | 23. | 432 | 497 | 22.4 | 28.7 | 1398 | 13802 | 75 | 0.1 | 0.2 | 28.9 | 3.2 |
| Film 4 | 60/100 | 105.1 | 59.0 | 27.1 | 13. | 293 | 125 | 19.7 | 17.7 | 999 | 10632 | 77 | 0.2 | 0.3 | 29.3 | 7.2 |
| Film 5 | 100/110 | 107.7 | 97.4 | 65.9 | 41. | 672 | 643 | 34.3 | 44.4 | 6669 | 32578 | 81 | 0.1 | 0.2 | 42.3 | 2.9 |
| Film 6 | 100/120 | 117.6 | 97.3 | 54.6 | 34. | 554 | 513 | 47.1 | 58.5 | 4286 | 31272 | 82 | 0.1 | 0.2 | 39.7 | 3.5 |
| Film 7 | 100/130 | 127.7 | 97.1 | 55.0 | 30. | 497 | 486 | 54.6 | 68.9 | 2321 | 29224 | 85 | 0.1 | 0.2 | 37.8 | 3.9 |
| Film 8 | 100/140 | 138.0 | 98.3 | 48.3 | 28. | 465 | 419 | 65.7 | 74.3 | 2067 | 23923 | 84 | 0.1 | 0.2 | 35.7 | 4.7 |

Starting from the material composition according to Table 1, the total thickness relative to the unfoamed state (i.e. the mass per unit area) on the one hand and the degree of foaming of the core layer 3 on the other hand were varied in preliminary tests. It was found that, as a result of foaming, the flexibility of the polyethylene coextruded film increases both in the manufacturing direction (MD) and in the transverse direction (CD).

In order to achieve a predetermined value for the stiffness compared to an unfoamed film, it is thus necessary to use less material. As a result of foaming, the weld strength decreases, and the coextruded polyethylene blown film is also more easily expanded as a result of the foaming of the core layer 3, which results in minimal impairment of the mechanical characteristics. In addition, the water-vapor transmission rate increases to a certain extent as a result of foaming.

The characteristics of the material composition according to Table 1 can be seen in Table 2.

In the first column of Table 2, the thickness in the foamed state is compared to the thickness that would result from the same material usage (without a foaming agent). The first column refers to prescribed values. The comparative example thus relates to a film that is not foamed. The degree to which the core layer 3 is foamed follows from the indicated thicknesses for an unfoamed and a foamed design.

The second column relates to the actually determined thickness in a film formed specifically according to the specifications.

The other columns disclose various characteristic parameters.

The coextruded polyethylene blown film according to the invention is particularly intended for use in packaging, although other applications are also conceivable. For instance, the coextruded polyethylene blown film can be used as a label film, in which case an especially smooth surface is then desired. The same applies to the use of the coextruded polyethylene blown film as a surface-protecting film, in which case the foamed core layer 3 can additionally provide mechanical damping and, through such a buffer effect, greater protection. Finally, the coextruded polyethylene blown film according to the invention also has a more pleasant, softer feel than an unfoamed film, thus imparting more of a textile character to it. The foamed film therefore also be used to a certain extent as a replacement for a textile or at least suggest textile characteristics, which are desirable, for example, in articles of clothing, disposable hygiene products or the like.

Use for an adhesive tape is also possible, in which case mechanical stresses can also be compensated for to a certain extend by the foamed core layer 3.

As a result of the relatively large thickness with a low mass per unit area, the coextruded polyethylene blown film can also be used as a kind of seal in the form of a closure label in order to serve as an original closure in screw closures or other containers, for example, with such a closure label being torn when opened for the first time.

Finally, due to its softer character compared to a film, the coextruded polyethylene blown film can also be used as a kind of waterproof replacement for paper, in which case fillers and additives can optionally be used in at least one of the outer layers 1 or 2 in order to improve writability. Kaolin and chalk are examples of additives that are suitable for this purpose.

Finally, it is also possible to introduce active substances into the core layer 3 during the foaming process which are then active over a long period of time. Relative to packaging, these can particularly be aromatic agents, absorbers, or the like. Such substances are preferably introduced with the foaming agent during extrusion.

The object of the invention is also a method of manufacturing a coextruded polyethylene blown film, where a polyethylene or a polyethylene-based mixture is provided in a blown film coextrusion system to form a core layer 3 that has a melt flow rate (MFR) per DIN ISO EN 1133 of greater than 5 g/10 min at 190° C. and 2.16 kg, a foaming substance being added to the core layer 3, and other polyethylene-based polymer components are provided to form a first weldable outer layer and a second outer layer 2, wherein the polymer components are coextruded from the gap of a coextrusion die under the formation of a blown-film tube, forming a first unfoamed weldable outer layer, a core layer 3 and a first unfoamed outer layer 2, the core layer 3 foams up and expands under the formation of core layer 3 immediately after emerging from the extrusion gap, and a total thickness of the coextruded polyethylene blown film of between 20 μm and 250 μm is produced as a result of the free foaming supported from below.

The invention claimed is:

1. A coextruded polyethylene blown film for packaging and with a thickness between 20 μm and 250 μm, the film comprising:
   a first unfoamed weldable outer layer;
   a second unfoamed outer layer, the outer layers each of a polyethylene or a polyethylene-based mixture as a polymer component having a melt mass-flow rate (MFR) per DIN ISO EN 1133 of less than 3 g/10 min; and
   a foamed, particle-containing core layer of a polyethylene or a polyethylene-based mixture as a polymer component having a melt mass-flow rate (MFR) per DIN ISO EN 1133 of greater than 5 g/10 min at 190° C. and 2.16 kg.

2. The coextruded polyethylene blown film defined in claim 1, wherein the mass-flow rate of the outer layers is less than 1 g/10 min at 190° C. and 2.16 kg.

3. The coextruded polyethylene blown film defined in claim 1, wherein the first outer layer has a higher melt mass-flow rate (MFR) than the second outer layer.

4. The coextruded polyethylene blown film defined in claim 1, wherein the foamed core layer has closed cells filled with nitrogen or carbon dioxide.

5. The coextruded polyethylene blown film defined in claim 1, wherein the foamed core layer has closed cells with a volume of less than 50000 $\mu m^3$.

6. The coextruded polyethylene blown film defined in claim 1, wherein the core layer has a density between 0.2 $g/cm^3$ and 0.8 $g/cm^3$.

7. The coextruded polyethylene blown film defined in claim 1, wherein the thickness of the foamed core layer is between 40% and 70% of a total thickness of the blown film.

8. The coextruded polyethylene blown film defined in claim 1, wherein the polymer component of the core layer contains a linear polyethylene as the main component.

9. The coextruded polyethylene blown film defined in claim 8 wherein the polymer component includes metallocene catalysts.

10. The coextruded polyethylene blown film defined in claim 8, wherein the polymer component of the core layer contains at least one other low-density polyethylene besides the linear polyethylene.

11. The coextruded polyethylene blown film defined in claim 1, wherein the outer layers are immediately adjacent and flank the core layer.

12. The coextruded polyethylene blown film defined in claim 1, wherein at least one of the outer layers contains colored particles.

13. The coextruded polyethylene blown film defined in claim 1, wherein the second outer layer has a matte surface with a reflectometer value per DIN 67530 of less than 40 at an angle of measurement of 85°.

* * * * *